(12) United States Patent
Buffenoir et al.

(10) Patent No.: US 7,628,356 B2
(45) Date of Patent: Dec. 8, 2009

(54) YAW CONTROL DEVICE FOR A NOZZLE HAVING A RECTANGULAR OUTLET SECTION

(75) Inventors: François Buffenoir, Pessac (FR); André Lafond, St Medard En Jalles (FR)

(73) Assignee: Snecma Propulsion Solide, Le Haillan (FR)

( * ) Notice: Subject to any disclaimer, the term of this patent is extended or adjusted under 35 U.S.C. 154(b) by 298 days.

(21) Appl. No.: 11/476,310

(22) Filed: Jun. 28, 2006

(65) Prior Publication Data

US 2007/0095972 A1 May 3, 2007

(30) Foreign Application Priority Data

Jul. 6, 2005 (FR) .................................. 05 07190

(51) Int. Cl.
 *B64C 9/38* (2006.01)
 *F02K 1/12* (2006.01)
(52) U.S. Cl. ....................... 244/23 D; 244/12.5; 244/52; 244/82; 60/770; 239/265.19
(58) Field of Classification Search ................ 244/3.22, 244/53 R, 52, 73 R, 76 J, 82, 23 D, 35 A, 244/12.5; 60/228, 230, 770, 771, 39.5; 239/265.11, 239/265.19, 265.25, 265.27, 265.29
See application file for complete search history.

(56) References Cited

U.S. PATENT DOCUMENTS

| | | | |
|---|---|---|---|
| 2,969,017 A | | 1/1961 | Kershner |
| 3,086,731 A | | 4/1963 | Beckington |
| 3,224,190 A | * | 12/1965 | Eckert .......................... 60/230 |
| 3,443,757 A | * | 5/1969 | Townend ................ 239/265.13 |
| 3,581,995 A | * | 6/1971 | Fischer ................... 239/265.19 |
| 4,005,823 A | * | 2/1977 | Thayer ................... 239/265.37 |
| 4,236,684 A | | 12/1980 | Berrier et al. |
| 4,643,374 A | | 2/1987 | Friederich et al. |
| 5,082,181 A | * | 1/1992 | Brees et al. ............. 239/265.35 |
| 5,170,964 A | | 12/1992 | Enderle et al. |
| 5,301,901 A | * | 4/1994 | Kutschenreuter, Jr. .... 244/53 R |
| 5,687,907 A | | 11/1997 | Holden et al. |
| 2007/0283679 A1 | * | 12/2007 | Pesyna et al. .................. 60/204 |

FOREIGN PATENT DOCUMENTS

| | | |
|---|---|---|
| GB | 764180 | 12/1956 |
| GB | 937829 | 9/1963 |
| WO | WO 01/18376 | 3/2001 |

* cited by examiner

*Primary Examiner*—Michael R Mansen
*Assistant Examiner*—Richard R Green
(74) *Attorney, Agent, or Firm*—Weingarten, Schurgin, Gagnebin & Lebovici LLP

(57) ABSTRACT

The invention relates to a yaw control device for an aircraft fitted with a supersonic nozzle having a rectangular or flat section comprising a supersonic throat extended by a diverging portion in which supersonic flow occurs. In order to enable the aircraft to be controlled in yaw in the absence of a vertical fin, the device of the invention makes use of jet control surfaces in the form of airfoils disposed in the diverging portion of the nozzle. The control surfaces are movable about respective pivot axes in order to generate a lateral force when in a deflected position, so as to enable the aircraft to turn about its yaw axis.

9 Claims, 4 Drawing Sheets

YAW CONTROL DEVICE FOR A NOZZLE HAVING A RECTANGULAR OUTLET SECTION

This application claims priority to French application No. 05 07190 filed Jul. 7, 2005.

BACKGROUND OF THE INVENTION

The present invention relates to aircraft of the furtive type, i.e. to aircraft that are designed specifically to minimize their equivalent radar signature (ERS) and their infrared signature. By way of non-exclusive example, aircraft of this type are unmanned combat air vehicles (UCAVs), also known as "drones", and because of the need for discretion (mainly in terms of ERS) they have airframes of a shape that is very flat without any vertical fin. In addition, the shape of the aircraft and the need for infrared discretion where the jet leaves the nozzle have led to the nozzle being given a so-called "two-dimensional" (or "2D") shape with the outlet section of the nozzle being rectangular or flat in shape with an aspect ratio of width over height of the order of 3 or more.

Eliminating the vertical fin (rudder) means that the aircraft must be given some other means to control yaw. Two solutions have been investigated so far. The first consists in achieving yaw control by means of aerodynamic control surfaces placed on the wings of the aircraft (double airfoil type control surfaces). Under such circumstances, the aircraft is controlled in yaw by differential drag between the two wings of the aircraft. Another solution consists in fitting the aircraft with a steerable nozzle that enables the direction of the thrust vector to be controlled.

Nevertheless, those two solutions for providing aircraft without a vertical fin with yaw control present drawbacks in terms of control effectiveness and engine performance. The use of aerodynamic control surfaces on the wings greatly increases the overall drag of the aircraft in order to generate a sufficiently large moment about the center of gravity of the aircraft. Similarly, yaw control systems that operate by steering thrust at the nozzle, in particular those that rely on injecting fluid over the side walls of the nozzle, do not enable yaw moments of sufficient magnitude to be obtained, in particular because of the very flat shape of the nozzle, which is not favorable to deflecting the thrust vector in yaw. Furthermore, mechanical systems for steering the nozzle, and consequently the thrust, are highly penalizing in terms of weight and bulk.

Finally, the above-described yaw control systems generally have an impact on the thrust performance of the engine.

OBJECT AND BRIEF SUMMARY OF THE INVENTION

The present invention seeks to provide a solution to the problem posed by achieving yaw control in aircraft without a vertical fin and fitted with a supersonic nozzle of rectangular or flat section, which solution enables a good yaw moment to be generated about the center of gravity of the aircraft, while limiting losses of thrust and impact on the thermodynamic cycle of the engine.

In accordance with the present invention, this object is achieved by a yaw control device comprising at least one jet control surface in the form of an airfoil placed in the diverging portion of the nozzle, said control surface being movable about a pivot axis in order to generate a lateral force when in a deflected position, so as to enable the aircraft to turn about its yaw axis. The yaw control device further comprises a stationary element disposed upstream from the or each jet control surface in the nozzle, said stationary element presenting an aerodynamic leading edge in order to protect the control surface from the supersonic flow in the nozzle.

The device of the invention enables yaw control to be achieved that is as effective as that which is achieved with a vertical fin. By positioning one or more jet control surfaces directly in the diverging portion, i.e. in the supersonic flow, a very large lateral force is generated and consequently a yaw moment is generated that is sufficient for providing the aircraft with yaw control. This large lateral force is obtained for a deflection of only a few degrees of the or each control surface. Deflecting the control surfaces generates thrust loss only temporarily.

In addition, since the control surface(s) is/are positioned in the diverging portion, i.e. downstream from the throat, they do not have an impact on the operating cycle of the engine, with the flow rate being controlled in the sonic throat upstream from the control surfaces. The operation of the engine is then decoupled from steering the aircraft.

The airfoil shape and the dimensions of the jet control surfaces are preferably selected in such a manner as to optimize their aerodynamic profile in the flow while in a non-deflected position.

Placing a stationary element upstream from each control surface serves to protect them from the supersonic flow while they are in the non-deflected position, and thus serves to reduce loss of thrust in continuous operation. The presence of one or more jet control surfaces in the supersonic flow generates shockwaves therein that induce losses of thrust. The stationary elements serve to "mask" the supersonic flow control surfaces when they are in the non-deflected position. For this purposes, the stationary elements are preferably located at least in part upstream of the sonic cutoff line in the nozzle. With these stationary elements, the device of the invention has negligible impact on the thrust performance of the engine so long as the device is not activated (i.e. when the control surfaces are not deflected).

According to an aspect of the invention, the device has a plurality of jet control surfaces, each of these control surfaces being connected to a single control lever, thus enabling a single actuator to be used for controlling all of the control surfaces.

The present invention also relates to a supersonic nozzle of rectangular or flat section including at least one yaw control device as described above.

The invention also provides an aircraft including such a nozzle for which aircraft it is advantageously possible to eliminate the vertical fin, since the yaw control device is integrated in the nozzle.

Finally, the present invention provides a method of providing yaw control for an aircraft fitted with a supersonic nozzle of rectangular or flat section having a sonic throat extended by a diverging portion in which supersonic flow occurs, said method comprising placing at least one jet control surface in the form of an airfoil inside the diverging portion of the nozzle, placing a stationary element upstream from the or each jet control surface, the stationary element presenting an aerodynamic leading edge and serving to protect the control surface from the supersonic jet in the nozzle, the stationary element(s) preferably being located at least in part upstream of the sonic cutoff line of the nozzle, with deflection of the jet control surface serving to generate a lateral force that enables the aircraft to turn about its yaw axis.

According to a particular aspect of the invention, a plurality of jet control surfaces are placed inside the diverging portion and they are connected to a single control lever for causing them to deflect simultaneously.

The number of jet control surfaces for placing inside the diverging portion, and their maximum deflection angle, are defined as a function of the yaw moment that needs to be generated for providing the aircraft with yaw control.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS OF THE INVENTION

Figure 1:
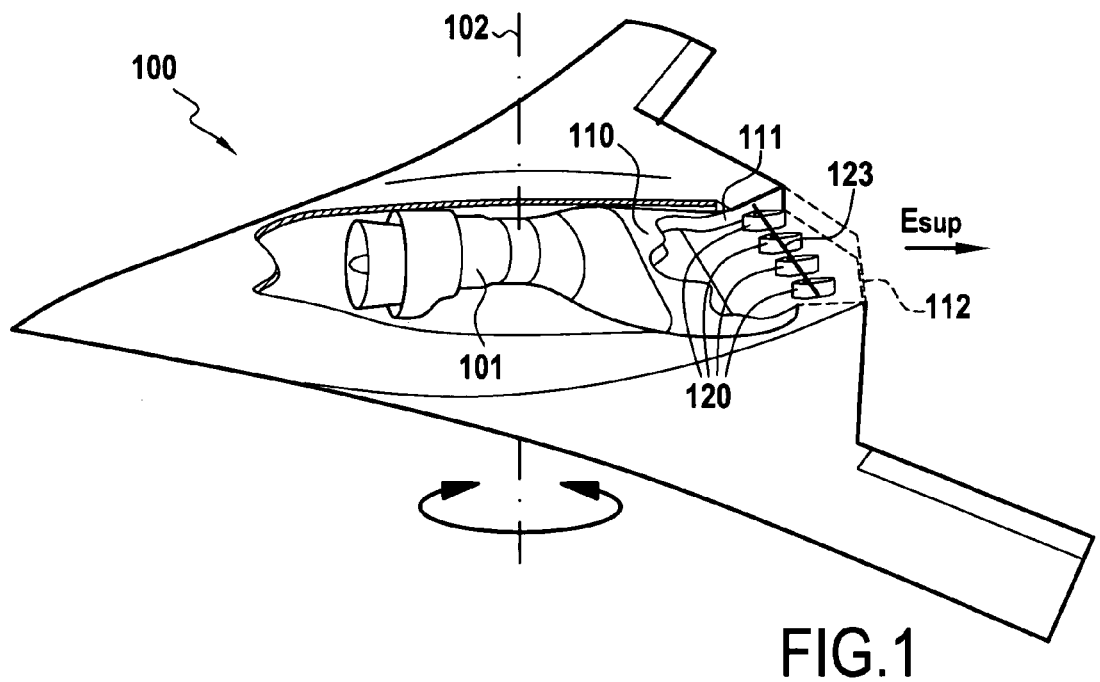
FIG. 1 is a highly diagrammatic view of an aircraft fitted with a yaw control device constituting an embodiment of the invention.

FIG. 1 is a highly diagrammatic view of an aircraft 100 of the unmanned combat air vehicle (UCAV) type, also known as a "drone", which is fitted with an engine 101 whose rear portion is in the form of a supersonic nozzle 110 having a sonic throat 111 and a diverging portion 112. The nozzle 110 presents a plane or "two-dimensional" shape, i.e. its diverging portion 112 presents a flat or rectangular section, and at its outlet section its aspect ratio of width over height can be of the order of 3 or greater.

Figure 2A:
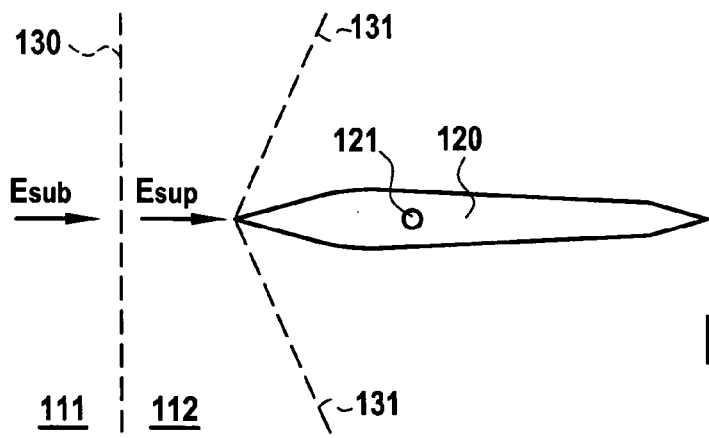
FIGS. 2A and 2B are plan views of a jet control surface of FIG. 1 respectively in a non-deflected position and in a deflected position.
Figure 2B:
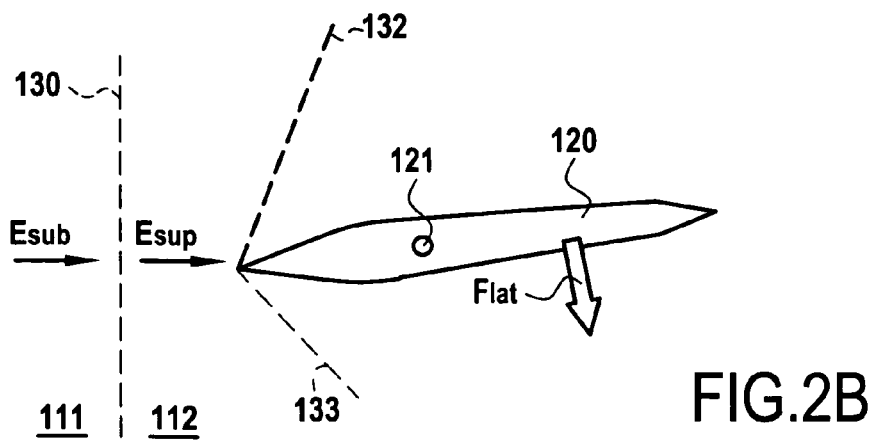

In order to conserve an airframe that is very flat in shape, the aircraft 100 does not have a vertical fin. In accordance with the invention, yaw control of the aircraft 100 is achieved by jet control surfaces 120 placed directly in the nozzle 110 so as to be subjected to the supersonic flow $E_{sup}$ of the jet which occurs in the diverging portion 112. As shown in FIG. 2A, each control surface 120 is in the form of an airfoil defining an aerodynamic profile for minimizing its influence on the supersonic flow of the jet. The control surfaces are placed vertically behind the sonic cutoff line 130 which is situated at the outlet from the sonic throat 111 and which defines the portion of the nozzle from which the flow speed goes from a subsonic value $E_{sub}$ to a supersonic $E_{sup}$. The control surfaces 120 are movable about respective axes 121 to enable them to be deflected. As shown in FIG. 2B, deflecting a control surface in the supersonic flow $E_{sup}$ established in the diverging portion enables a large lateral force $F_{lat}$ to be generated. In the deflected position, the control surfaces generate a shockwave 132 in the supersonic flow $E_{sup}$ on one face, and on the opposite face they generate a shockwave that is weaker or even constitutes a line of expansion 133. The pressure disturbances on each of the faces of the control surface are thus very different, thereby enabling the lateral force $F_{lat}$ to be created that is immediately very large for a deflection of the order of a few degrees only.

With this solution, a yaw moment is obtained that is sufficient to enable the aircraft to be steered. The number of control surfaces and the maximum deflection angle thereof is defined as a function of the yaw moment at is needed. for steering the aircraft about its yaw axis 102.

Since the control surfaces are situated in the supersonic portion of the flow, the rate of flow passing through the sonic throat and the operation of the engine are unaffected by the control surfaces being deflected.

Figure 3:
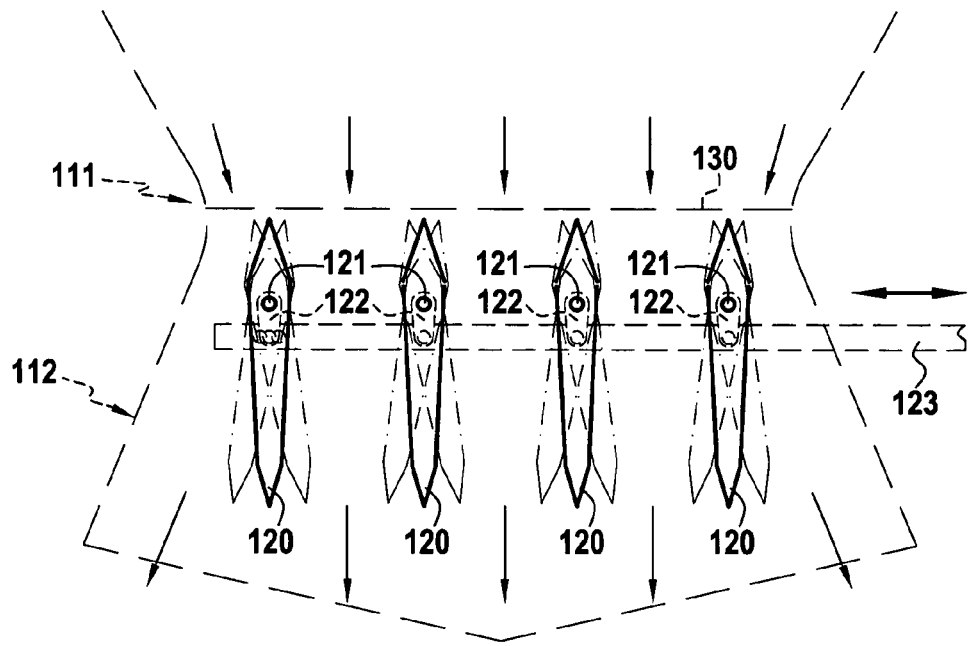
FIG. 3 is a plan view of the set of jet control surfaces of FIG. 1.
Figure 6:
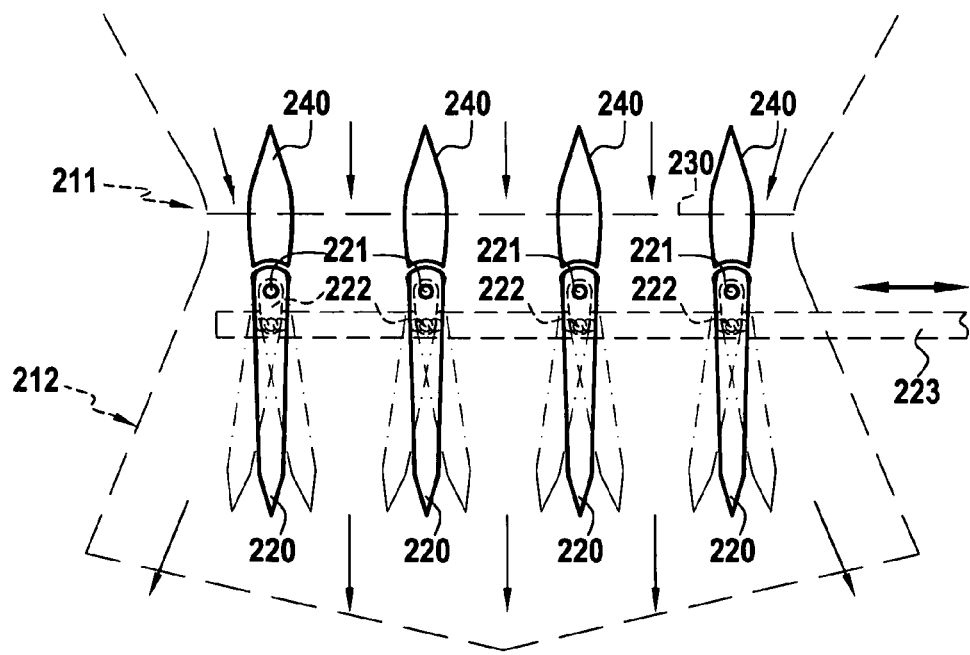
FIG. 6 is a plan view of the set of jet control surfaces of FIG. 4.

As shown in FIG. 3 and FIG. 6, the control surfaces 120, 220 can be deflected using a single lever 123, 223 connected to the pivot pin 121, 221 secured to each control surface by a cam 122, 222, thus enabling all of the control surfaces to be actuated simultaneously with a single actuator.

Although the use of jet control surfaces in the supersonic flow enables a maximum yaw moment to be generated about the center of gravity of the aircraft, and consequently is highly effective at taking the place of a vertical fin, their presence in the supersonic flow generates a shockwave 131 (FIG. 2A) in the flow, thus leading to a loss of thrust of several percent, this loss increasing proportionally with increasing deflection angle of the control surfaces.

To mitigate this drawback, the present invention, in another embodiment, proposes including a stationary element upstream from each control surface, the state of the element being of a shape that is adapted to protect the control surface in front of which it is located from the supersonic flow. For this purpose, the stationary element presents a leading edge of aerodynamic shape that is sufficiently wide to mask the flow control surface when in its non-deflected position, with at least part of the stationary element being situated in the subsonic portion of the flow, i.e. upstream from the sonic cutoff line in the nozzle.

Figure 4:
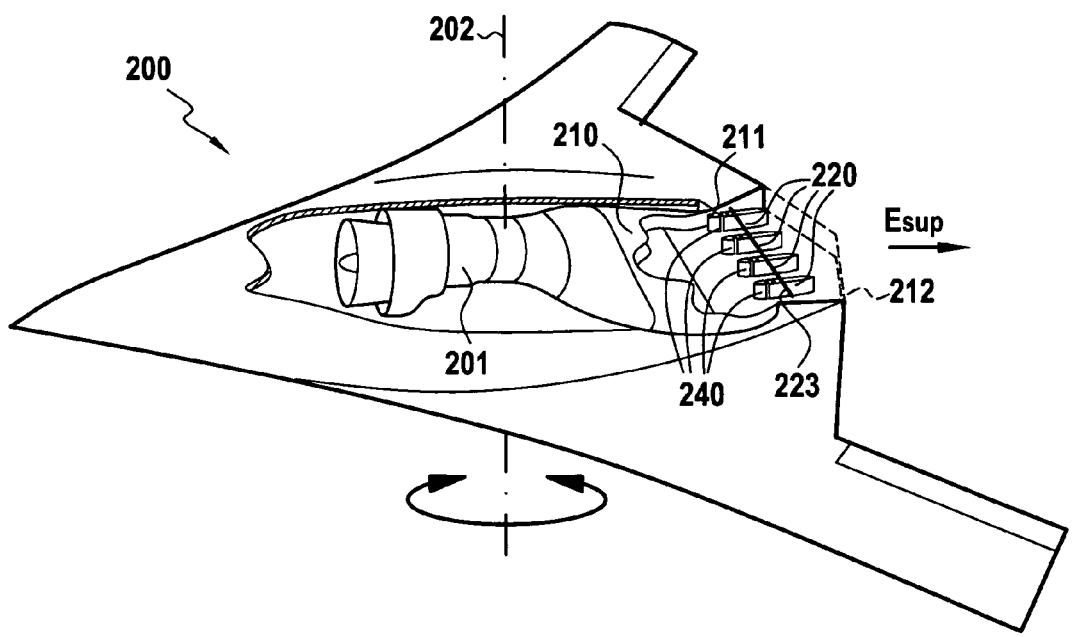
FIG. 4 is a highly diagrammatic view of an aircraft fitted with a yaw control device constituting another embodiment of the invention.
Figure 5A:
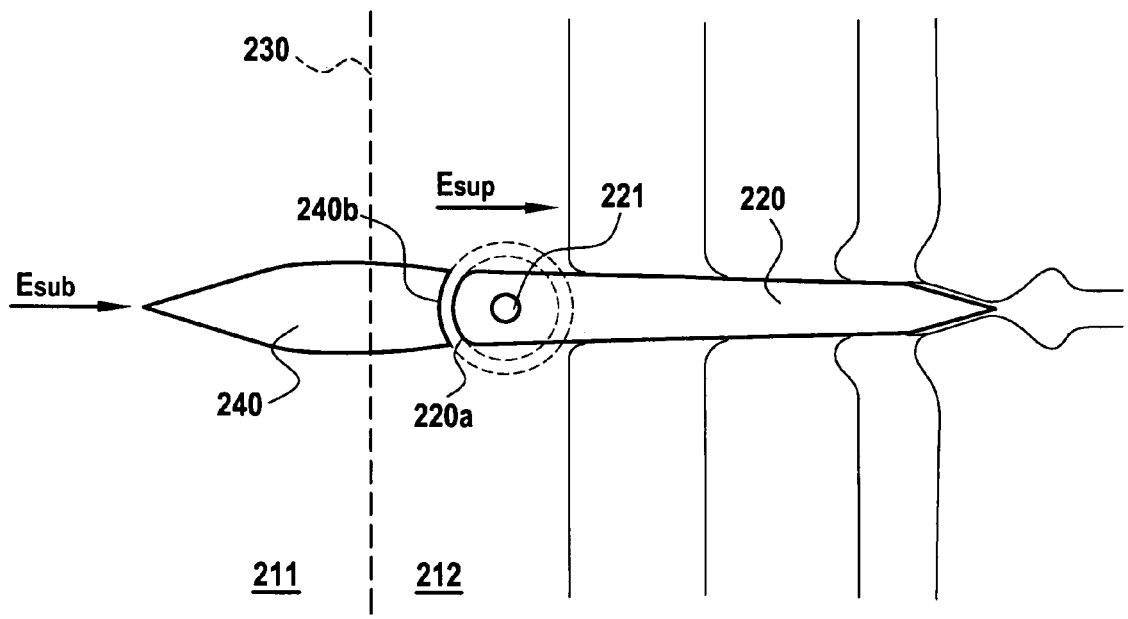
FIGS. 5A and 5B are plan views of a jet control surface of FIG. 4 respectively in a non-deflected position and in a deflected position.

An embodiment is shown in FIG. 4 which shows an aircraft 200 of the same type as that described above, i.e. an aircraft fitted with an engine 201 whose rear portion is formed by a "two-dimensional" supersonic nozzle 210 comprising a sonic throat 211 and a diverging portion 212 having a rectangular outlet section. As explained above, one or more (several in FIG. 4) jet control surfaces 220 are disposed vertically in the nozzle 210 in the diverging portion 212 so as to enable the aircraft to be steered in yaw. In this embodiment of the invention, stationary elements 240 are located at the respective upstream ends of the control surfaces 220. The stationary elements 240 present a profile that is aerodynamic and they are placed at least in part in the converging portion of the nozzle, i.e. in the sonic throat 211 where the flow $E_{sub}$ is not yet supersonic. This disposition is shown in FIG. 5A where it can be seen that the sonic cutoff line 230 in the flow is situated level with the stationary elements 240 that extend beyond said sonic cutoff line into the section of the diverging portion 212 in which the control surface 220 is located within the supersonic flow $E_{sup}$.

In the non-deflected position, the control surfaces are thus protected from the supersonic flow, and the only loss of thrust is due to friction against the walls of the nozzle (the area in contact with the flow being increased little by the presence of the stationary elements), and also to any small shockwaves that may be present in the flow because of the small amount of clearance that remains between the stationary elements and the control surfaces.

Figure 5B:
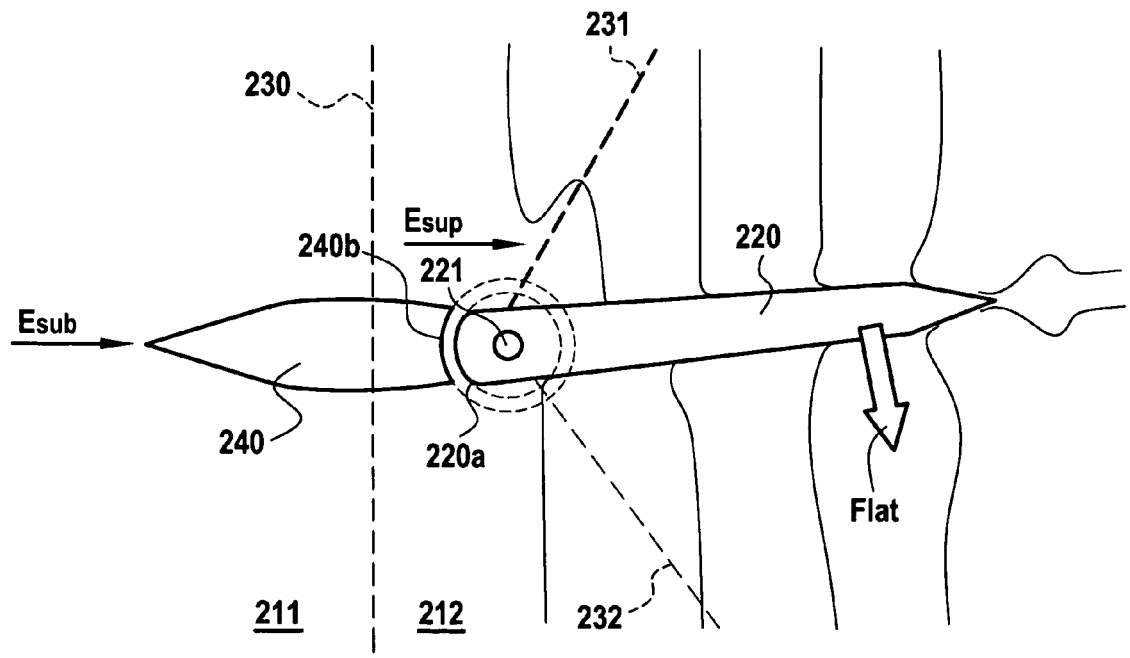

When the control surfaces 220 are deflected by causing them to pivot about their respective axes 221, as shown in FIG. 5B, then a shockwave 231 is generated on one face of the control surface, and on its other face there is generated a shockwave that is weaker or even an expansion line 232, thus establishing a large pressure differential between the two faces, and consequently a lateral force $F_{lat}$ that turns the aircraft about its yaw axis 202. The pivot axis 221 of each control surface 220 is preferably placed as close to the upstream stationary element 240 as possible so as to minimize the extent to which the upstream edge 220a of the control surface 220 projects relative to the stationary element 240 during deflection. As shown in FIGS. 5A and 5B, the pivot axes 221 of the control surfaces 220 are preferably selected in such a manner as to define the centers of circles that are concentric with a circle passing over the downstream edge 240b of the stationary element 240.

The jet control surfaces and the stationary elements may be made of metal or of a thermostructural composite material (e.g. carbon/carbon (C/C), carbon/silicon carbide (C/SiC), or silicon carbide/silicon carbide (SiC/SiC)).

The yaw control device is not restricted to the above-described aircraft. It can be used in more general manner in any type of aircraft fitted with a nozzle presenting a two-dimensional shape and for which it is desired to find a solution that is more discrete than a vertical fin for providing yaw control.

What is claimed is:

1. A yaw control device for an aircraft fitted with a supersonic nozzle of rectangular cross section, said nozzle having a stationary supersonic throat extended by a diverging portion, the supersonic throat having an outlet downstream of which supersonic flow occurs, said device comprising at least one jet control surface in the form of an airfoil disposed fully within the diverging portion of the nozzle to be completely in said supersonic flow, said at least one jet control surface being disposed vertically so as to be movable about a vertical axis of rotation, to generate a lateral force when in a deflected position, thereby enabling the aircraft to turn about its yaw axis, the device further comprising a stationary element disposed upstream from at least one jet control surface in the nozzle, said stationary element presenting an aerodynamic leading edge in order to protect the control surface from the supersonic flow in the nozzle.

2. A device according to claim 1, wherein the stationary element is disposed upstream of the at least one jet control surface, wherein some portion of said stationary element is disposed in the supersonic throat and in a region of sonic or subsonic flow.

3. A device according to claim 1, wherein the at least one jet control surface comprises a plurality of jet control surfaces, each of said control surfaces being connected to a single control lever enabling said jet control surfaces to be deflected simultaneously.

4. A supersonic nozzle of rectangular or flat section, including at least one yaw control device according to claim 1.

5. An aircraft without a vertical fin, including a nozzle according to claim 4.

6. A method of providing yaw control for an aircraft fitted with a supersonic nozzle of rectangular cross section, said nozzle having a stationary supersonic throat extended by a diverging portion in which supersonic flow occurs, the supersonic throat having an outlet, said method comprising:

disposing at least one jet control surface in the form of an airfoil fully in the diverging portion of the nozzle vertically completely within said supersonic flow, so as to be movable, about a vertical axis of rotation;

generating lateral force by moving at least one jet surface into a deflected position, thereby enabling the aircraft to turn about its yaw axis; and disposing a stationary element having an aerodynamic leading edge upstream from jet control surface in the nozzle, said at least one leading edge being structured and arranged to protect the control surface from the supersonic flow in the nozzle.

7. A method according to claim 6, further comprising:

disposing the stationary element upstream of the at least one jet control surface, wherein some portion of said stationary element is disposed in the supersonic throat and in a region of sonic or subsonic flow.

8. A method according to claim 6, wherein disposing the at least one jet control surface comprises disposing a plurality of jet control surfaces inside the diverging portion, and wherein the control surfaces are connected to a single control lever for causing them to be deflected simultaneously.

9. A method according to claim 6, wherein disposing the at least one jet control surface comprises disposing a predetermined the number of jet control surfaces inside the diverging portion.

* * * * *

UNITED STATES PATENT AND TRADEMARK OFFICE
CERTIFICATE OF CORRECTION

PATENT NO. : 7,628,356 B2  Page 1 of 1
APPLICATION NO. : 11/476310
DATED : December 8, 2009
INVENTOR(S) : Francois Buffenoir et al.

It is certified that error appears in the above-identified patent and that said Letters Patent is hereby corrected as shown below:

Column 6, claim 6, line 24, "from jet" should read --from at least one jet--;

Column 6, claim 6, line 25, "said at least one leading" should read --said leading--; and Column 6, claim 9, line 40, "the number" should read --number--.

Signed and Sealed this

Twelfth Day of October, 2010

David J. Kappos
*Director of the United States Patent and Trademark Office*